United States Patent [19]

Perry

[11] Patent Number: 5,358,143
[45] Date of Patent: Oct. 25, 1994

[54] METHOD OF CONTINUOUS OPERATION OF A STORAGE TANK

[75] Inventor: Michael R. Perry, Kenilworth, United Kingdom

[73] Assignee: Courtaulds Fibres (Holdings) Limited, London, England

[21] Appl. No.: 67,330

[22] Filed: May 24, 1993

[30] Foreign Application Priority Data

Jul. 22, 1992 [GB] United Kingdom ............ 9215570.4

[51] Int. Cl.⁵ .......................... B67B 7/00; B67D 5/42
[52] U.S. Cl. ........................................ 222/1; 222/386
[58] Field of Search .................... 222/64–66, 222/1, 386, 386.5; 137/487.5; 141/192, 198, 94, 95; 73/412

[56] References Cited

U.S. PATENT DOCUMENTS

| | | | |
|---|---|---|---|
| 3,300,091 | 1/1967 | Wondrak et al. | 222/64 X |
| 3,659,748 | 5/1972 | Beck | 222/64 X |
| 3,804,297 | 4/1974 | Jurjans | 222/64 X |
| 3,901,724 | 8/1975 | White | 222/64 X |
| 3,924,780 | 12/1975 | Elsworth | 222/64 |
| 4,378,897 | 4/1983 | Kattlemann | 222/64 X |
| 4,458,827 | 7/1984 | Stelte | 222/64 X |
| 4,527,714 | 7/1985 | Bowman | 222/64 X |
| 4,823,987 | 4/1989 | Switall | 222/64 X |
| 5,016,686 | 5/1991 | Gerstenkorn | 222/64 X |

FOREIGN PATENT DOCUMENTS 3416899 5/1984 Fed. Rep. of Germany .
841403 7/1960 United Kingdom .

Primary Examiner—Andres Kashnikow
Assistant Examiner—Kenneth DeRosa
Attorney, Agent, or Firm—Davis Hoxie Faithfull & Hapgood

[57] ABSTRACT

A method of storing liquid in a tank, said tank having a moveable follower carrying one of an inlet or outlet port of said tank, said liquid being concurrently and continuously fed to and delivered from said tank and the volume of said liquid in said tank varying in response to variations in the rates of supply and demand.

13 Claims, 2 Drawing Sheets

METHOD OF CONTINUOUS OPERATION OF A STORAGE TANK

FIELD OF THE INVENTION

This invention relates to a method of operating storage tanks for liquids, more particularly to a method of continuous operation, and in particular for liquids which have time-dependent properties.

BACKGROUND OF THE INVENTION

It is common for liquids in a chemical process plant to be held in and pass through a tank or series of tanks between processing operations. Such tanks may be called (among other names) storage tanks, buffer tanks, intermediate tanks or capacity tanks. They may be operated continuously or discontinuously (batchwise). In continuous operation, the liquid is substantially continuously supplied to and substantially continuously extracted from the tank. It is common for continuously-operated tanks to be equipped with an instrumental level measurement and control system, so that the volume or the residence time of the liquid stored in the tank can be controlled. The instrumental system may be designed so that normal variations in demand cause a signal to be sent to earlier stages in the process where the signal acts to produce corresponding variations in supply. This is known as feedback control. Continuously-operated storage tanks can also be equipped with control systems which respond to more extreme variations, for example temporary cessation of supply or demand, and therefore act as buffer or surge tanks. If supply is temporarily interrupted, then demand can be fulfilled for a limited time from the volume of liquid stored in the tank. If demand is temporarily interrupted, then supply can continue at the same or a reduced rate using the excess capacity of the tank for storage until demand is restored.

Certain liquids have time-dependent properties, and it is desirable to control their residence time in a process plant on the microscopic as well as the macroscopic scale. Examples of such liquids include polymer dopes for the manufacture of regenerated cellulose articles, for example fibres and films. Examples of this type of liquid include solutions of cellulose in tertiary amine N-oxides, for example, N-methylmorpholine N-oxide, which are useful in the manufacture of regenerated cellulose articles such as fibres and films. It is desirable to minimise the residence time of these solutions in a manufacturing plant, and to ensure uniform and consistent flow so that stagnation is avoided. Another example of such a liquid is viscose. This is prepared by dissolving sodium cellulose xanthate in aqueous sodium hydroxide; filtered; deaerated; and extruded through a suitable die to form regenerated cellulose fibre or film. Freshly-prepared (young) viscose is referred to as being "unripe", and must be stored for a controlled time while chemical changes take place in it to render it suitable for extrusion ("ripe"). Old viscose is referred to as being "overripe", and it too is unsuitable for extrusion. Furthermore, on extended storage viscose sets solid and becomes useless, and this can cause damage to the process plant itself. Finally, it is known that ripe viscose has superior properties to a mixture of overripe and underripe viscoses having the same degree of ripeness.

Storage tanks of the type hereinabove described are not entirely satisfactory as continuously-operated tanks for the storage of liquids which have time-dependent properties, since they tend to give regions of non-uniform and discontinuous flow and to have zones of stagnation. It is conventional to equip such tanks with a suitable mechanical stirrer to mix the liquid stored in the tank. Use of a stirrer is especially necessary with high viscosity liquids, for example viscose and solutions of cellulose in tertiary amine N-oxides, since such liquids follow a laminar flow regime and are therefore particularly prone to stagnation. In contrast, low viscosity liquids, for example water, generally follow a turbulent flow regime in which stagnation is less likely to occur. Use of such a stirrer involves additional expenditure for the installation of the stirrer itself and on the power required to operate it. Furthermore, the stirrer mixes together young and old liquid contained within the tank, so that residence time on the microscopic scale is not controllable as accurately as could be desired. The flow of the liquid through such a stirred tank does not approximate to a "first in, first out" principle.

GB-A-841,403 says that where a supply device continuously supplies a viscous material (for example, margarine) and an accepting device intermittently accepts a quantity of the material, that it is desirable to interpose a compensating device which compensates for the difference in the rates of the supply and acceptance. It describes a compensating device which comprises a chamber having an outlet, a piston movable within the chamber so as to vary its capacity and adapted to be urged to decrease the capacity of the chamber, and inlet means for conducting viscous material under pressure to the face of the piston. At least part of the inlet means is situated in the chamber between the face of the piston and the outlet, and is movable with the piston. The piston may operate a valve in the supply line by means of a mechanical linkage, whereby a reduction in the capacity of the chamber acts to open the valve and an increase in the capacity of the chamber acts to close the valve. In use, the piston intermittently operates to expel aliquots of the viscous material from the chamber to the accepting device, so that for example margarine can be packaged in small tubs. GB-A-841,403 only describes a process in which the accepting device accepts the material intermittently, and does not mention any process in which both supply and acceptance are continuous.

DE-A-3,416,899 describes a machine for decorating cakes, for example with lettering in chocolate. A batch of chocolate contained in a cylinder is expelled through nozzles onto the cakes to be decorated by the operation of a pneumatically-driven piston acting within the cylinder. Movement of the piston to a lower position on expulsion of the chocolate activates a low-level limit switch. Activation of this switch causes signals to be sent which reduce the downward pressure on the piston and which start a gear pump. The gear pump pumps chocolate from an external hopper through a flexible tube connected to the interior of the hollow piston rod and thence into the cylinder. This pumping causes the piston to move to an upper position where it activates a high-level limit switch indicating that the cylinder has been filled with a fresh batch of chocolate. Activation of this switch causes signals to be sent which stop the gear pump and raise the downward pressure on the piston to the previous higher value. The cycle is repeated an necessary. DE-A-3,416,899 does not mention any process in which the supply of chocolate to the cylinder is continuous.

DISCLOSURE OF THE INVENTION

According to this invention a method is provided for storing liquid in a tank, the tank having an inlet port whereby liquid is fed to the tank from a source of supply and an outlet port whereby liquid is delivered from the tank to a source of demand, the volume of the liquid being defined by an end of the tank, the wall or walls of the tank and a moveable follower within the tank, one of said ports being situate in or near said end of the tank and the other of said ports being attached to and moveable with the moveable follower, the liquid being concurrently and continuously fed to and delivered from the tank, and the volume of the liquid in the tank varying in response to variations in the rates of supply and demand.

In one embodiment of the invention, the end of the tank is the base of the tank, the wall or walls is/are substantially vertical, and the moveable follower is a float which moves up and down as the level of the liquid in the tank rises and falls. It may be preferred that the follower should extend over substantially the whole of the surface of the liquid, for example to guard against objects falling into the tank. A float of this type is essentially a passive follower, whose movement up and down does not directly influence the flow of liquid through the tank.

In another embodiment of the invention, which may be preferred, the wall or walls of the tank define a uniform cross-section, the moveable follower is a piston, and there is a seal between the wall or walls and the piston. The tank preferably has a circular cross-section, so that it has a single cylindrical wall. The liquid is fully enclosed between the end and the wall(s) of the tank and the piston. This has the advantage that the liquid is guarded from the atmosphere and is fully contained. In this embodiment the tank may be installed in essentially any orientation, although it may generally be preferred to install it so that the piston moves in a substantially vertical direction and is located above the contained liquid or so that the piston moves in a substantially horizontal direction.

The piston may be a wholly passive device, moving only in response to a change in volume of liquid in the tank. Alternatively, external pressure may be applied to the piston so that it operates as a ram to pressurise the liquid. Such a ram is in general not used to discharge liquid from the tank, but only to pressurise the liquid. Use of a ram may be advantageous when liquid is supplied to the tank by a feed pump which operates most effectively when positive pressure is applied to its delivery side and when liquid is extracted from the tank by a discharge pump which operates most effectively when positive pressure is applied to its suction side. This is true of certain types of volumetric metering pumps, for example gear pumps. Pressure may be applied to the piston for example pneumatically, hydraulically or mechanically, or by a combination of these techniques. In a preferred embodiment the piston is equipped with a central rod which transmits mechanical pressure to the piston. The tank may be a closed tank pressurised with air or an inert gas so as to minimise the pressure differential across the seal between the piston and the wall or walls of the tank.

In one embodiment of the invention, the inlet port is the port in or near the end of the tank and the outlet port is attached to and moveable with the moveable follower. In another embodiment of the invention, the opposite arrangement is used. Each port may be a single port, or may be a multiple port or distribution ring.

The port attached to the moveable follower connects with a pipe fixed with respect to the tank. This connection may take the form of a flexible hose. In a preferred embodiment of the invention, the connection takes the form of telescopic tubing. This tubing may be located outside the liquid, so that the fixed pipe is situated remotely from the end of the tank in or near which the other port is located. In a preferred arrangement, the tubing is immersed in the liquid, so that the fixed pipe is situated nearby the other port. This has the advantage that the tank can be made more compact. If the liquid in the tank must be maintained at a controlled temperature, the arrangement has the further advantage that the telescopic tubing does not have to be lagged or otherwise adapted for temperature control. An example of such a liquid requiring temperature control is a solution of cellulose in N-methylmorpholine N-oxide, which solidifies at room temperature. If the liquid in the tank is pressurised, immersing the tubing in tank liquid has the further advantage that high quality seals between the telescopic sections of the tubing are not required. In its simplest form, the telescopic tubing may consist of one tubular section attached to the follower engaging with another tubular section fixed to and passing through the end of the tank to form or connect with the fixed pipe. More complex forms which comprise more sections of tubing can also be envisaged.

When the tubing is immersed in the liquid, the port attached to and moveable with the moveable follower may consist of holes in the tubing at the end of the tubing adjacent to the moveable follower. The tubing is preferably attached to the moveable follower in a manner allowing a degree of rocking of the tubing relative to the follower. A pivot pin and ring is one easy way of mounting the tubing to the moveable follower providing some play between the telescopic sections to ensure telescopic operation and reduce the requirement for exact concentric and linear alignment of the sections of tubing.

The tank is preferably provided with thermal insulation and/or a heating or cooling jacket to maintain the liquid in the tank at constant temperature. The jacket may be electrically heated or may be a hollow jacket containing a circulating heat transfer fluid such as brine, water or steam.

The liquid may be a pure liquid or mixture of liquids or a solution, or may be a suspension or slurry of a solid in a liquid.

The liquid in the tank is preferably in a laminar flow regime; that is, the Reynolds number is less than about 2000 to 3000. This means that the degree of mixing in the tank will be small and so the flow of liquid through the tank will approximate to "first in, first out" flow. Laminar flow is most readily achieved if the liquid is a high viscosity liquid, for example a polymer dope, particularly a dope intended for the manufacture of regenerated cellulose fibre or film, more particularly viscose or preferably a solution of cellulose in a tertiary amine N-oxide.

The method of operation of the invention is preferably controlled instrumentally. The desired position of the follower which corresponds to the desired volume or residence time of liquid in the tank is established as a set point in an instrumental controller. Variations in the rate of demand cause the follower to move away from its set point. The resulting instrumental signal is used to control apparatus on the inlet side of the tank, for example to vary the speed of a feed pump, so as to adjust the feed rate of liquid from the source of supply and consequently to restore the follower to its set point. The desired volume or residence time can be altered by simple adjustment of the set point, whereupon the instrumental controller acts to establish a new equilibrium position for the follower. The flow of liquid through the tank is continuous, and follows a generally "first in, first out" regime.

It is generally desirable in a process plant designed for continuous operation to maintain continuity of operation to the greatest extent possible. If supply to a tank operated according to the method of the invention is interrupted for any reason, the liquid stored in the tank will serve to meet demand for a limited time, possibly at a reduced rate, until supply is reinstated, following which a temporarily increased rate of supply will cause the follower to return to its set point. The volume of liquid stored in the tank may be temporarily increased to accommodate a planned interruption of supply to the tank, for example during a filter change, to ensure continuous delivery to the source of demand. This is a particular advantage where interruption in the continuous flow to the source of demand would stop production on continuously-operating equipment such as fibre spinning or film extrusion machines. It is well known that product (fibre or film) quality is often inferior for some time after the resumption of production following such a stoppage. It is also known that, the composition of circulating process liquors, for example coagulating baths and wash liquors, frequently moves away from its set point value during such a stoppage; in consequence, the fibre or film produced for some time after the resumption may be off-specification, for example in its dye affinity. If demand from a tank operated according to the method of the invention is interrupted for any reason, then supply to the tank can continue at the same or a reduced rate using the excess capacity of the tank as buffer volume until demand is re-established. In either case, the generally "first in, first out" flow regime of liquid through the tank is preserved, which is important for liquids having time-dependent properties.

BRIEF DESCRIPTION OF THE DRAWINGS

The invention will now be more particularly described, by way of example, with reference to the accompanying drawings, in which.

MODES FOR CARRYING OUT THE INVENTION

Figure 1:
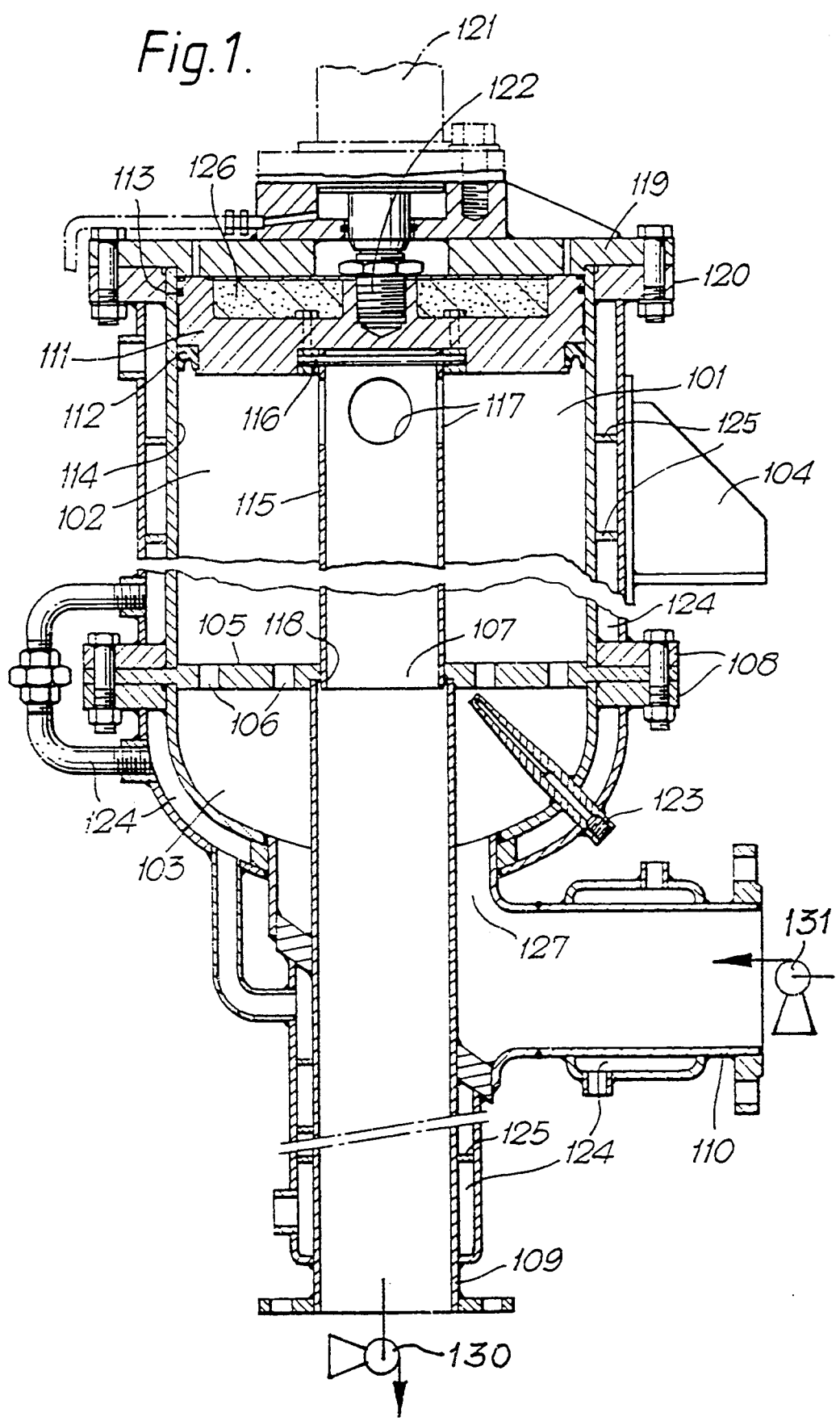
FIG. 1 is a cross-sectional side view of one embodiment of a tank for use in the invention.

Referring to FIG. 1, a vertically-mounted stainless steel tank 101 consists of a cylindrical body 102 mounted on a generally hemispherical base 103. Body 102 has an internal diameter of 500 mm and a height of 1120 mm and is equipped with four mild steel support lugs 104 arranged equidistantly around its periphery. A horizontal circular plate 105 perforated by holes 106 and by a central circular opening 107 is located between body 102 and base 103. Holes 106 are each 25 mm in diameter and are arranged in an inner ring (of 240 mm diameter) of eight holes and an outer ring (of 420 mm diameter) of twelve holes. Holes 106 serve to distribute the flow of liquid over the cross-section of tank 101. Body 102, plate 105 and base 103 are clamped together utilising external circular flanges 108 situated at the lowermost end of body 102 and at the uppermost end of base 103.

A stainless steel outlet pipe 109 having a nominal bore of 150 mm passes axially through and is fixed to base 103. Pipe 109 extends upwardly to seat in the underside of plate 105 at the periphery of opening 107. The lower end of pipe 109 extends downwardly from base 103 to connect with a source of demand (not shown) by way of a volumetric metering pump shown generally as 130. Liquid is supplied to tank 101 from a source of supply (not shown) by way of a second volumetric metering pump shown generally as 131 through a horizontal inlet pipe 110 having a nominal bore of 150 mm which connects with an annular inlet port 127 located centrally in base 103 around outlet pipe 109. The outer diameter of the annular port 127 is 250 mm.

A stainless steel piston 111, shown in its uppermost position in FIG. 1, is located inside body 102 and is equipped with a nitrile rubber U-ring 112 and a PTFE O-ring 113 which serve to seal piston 111 to wall 114 of body 102 in a liquid-tight manner. A stainless steel tube 115 having a nominal bore of 130 mm is pivotally mounted by means of a pivot pin and ring 116 centrally on the lower face of piston 111 and extends downwardly therefrom a distance of 1050 mm. Tube 115 is pierced adjacent piston 111 by four circular orifices 117 equidistantly placed around the periphery of tube 115 which together form an outlet port. Orifices 117 are each 75 mm in diameter and the centre of each orifice 117 is situated 50 mm from the underside of piston 111. Downwardly extending end 118 of tube 115 passes through opening 107 in plate 105 and slidingly engages into outlet pipe 109. The clearance between tube 115 and opening 107 is approximately 1 mm. The pivotal mounting of tube 115 on piston 111 serves to simplify alignment of tube 115 with opening 107 during assembly and operation.

A circular cover 119 is seated upon body 102 and clamped thereto by means of external circular flanges 120 located at the uppermost end of body 102. A hydraulic cylinder 121 is mounted on cover 119 and serves to apply mechanical pressure downwardly on piston 111 by means of a central rod 122 attached to cylinder 121. The normal working pressure of the liquid inside tank 101 is 0.5 MPa and the maximum working pressure is 1.3 MPa. The stroke of piston 111 is approximately 1000 mm. The normal working volume of tank 101 is approximately 0.1 $m^3$ and the maximum working volume approximately 0.2 $m^3$. The liquid may be a solution of cellulose in an amine N-oxide such as N-methylmorpholine N-oxide.

A temperature-measuring thermocouple probe 123 is mounted in base 103. Tank 101 and its associated pipework are equipped with jackets 124 through which a heat transfer fluid such as water may be passed. Jackets 124 are generally 25 mm across and are equipped with internal baffles 125 which serve to provide even distribution of the heat transfer fluid. The upper face of piston 111 is equipped with a layer of thermal insulating material 126.

In operation, the vertical position of piston 111 relative to tank 101 is monitored by continuous measurement of the vertical position of rod 122 and compared with a set point in a measuring instrument (not shown). Deviation from the set point causes an electrical signal to be sent to the source of supply. If the piston is above the set point, so that the volume of liquid currently contained in the tank is too large, the signal acts to reduce the rate of supply until the set point has been restored and the tank once again contains the desired volume of liquid. If the piston is below the set point, so that the volume of liquid currently contained in the tank is too small, the signal acts to increase the rate of supply until the set point has been restored and the tank once again contains the desired volume of liquid.

If it is desired to alter the volume or residence time of the liquid in the tank, the set point is changed to reflect the new desired value. The instrumental system then operates automatically to adjust the equilibrium position of the piston so that the desired value is attained.

If supply to the tank is temporarily reduced or interrupted for any reason without affecting the source of demand, the volume of liquid contained within the tank begins to fall. The resulting continually-increasing deviation of the measured position of the piston from the set point causes a signal to be sent to the source of demand. A signal may also be sent from the source of supply to the source of demand to indicate the state of affairs. The source of demand may then act appropriately in response to the signal or signals to reduce the rate of demand until supply has been reinstated, drawing on the volume of liquid contained in the tank as a buffer.

If demand from the tank is temporarily reduced or interrupted for any reason without affecting the source of supply, the volume of liquid contained within the tank begins to rise. The resulting continually-increasing deviation of the measured position of the piston from the set point causes a signal to be sent to the source of supply. A signal may also be sent from the source of demand to the source of supply to indicate the state of affairs. The source of supply may then act appropriately in response to the signal or signals to reduce the rate of supply until demand has been reinstated, utilising the excess capacity of the tank as a buffer volume.

Figure 2:
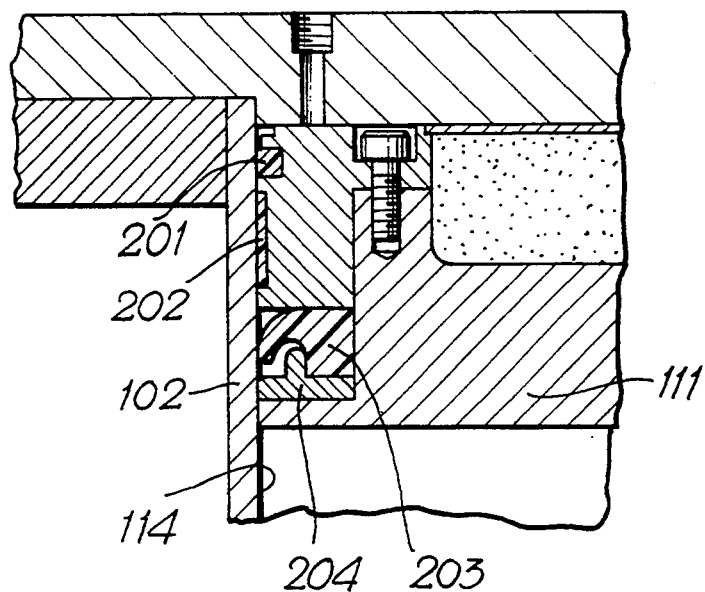
FIG. 2 is a scrap view on an enlarged scale showing an alternative form of seal between the body of the tank shown in FIG. 1 and the piston therein.

FIG. 2 shows an alternative method of forming a seal between wall 114 of body 102 and piston 111. The seal consists of a PTFE 0-ring 201, an annular PTFE bearing strip 202 and an annular PTFE lip ring 203 of U-shaped cross-section retained by a retaining ring 204.

What is claimed is:

1. A method of storing a liquid in a tank, said liquid being concurrently and continuously fed to and delivered from said tank, said tank having an end and at least one wall,
said tank having an inlet port connected to a source of supply of said liquid and an outlet port connected to a source of demand for said liquid,
said tank containing a movable follower,
one of said inlet port and said outlet port being situate in the vicinity of said end and the other of said inlet port and said outlet port being attached to and movable with said movable follower,
the present volume of said tank being defined by said end, said at least one wall and the present position of said movable follower within said tank, said present volume changing according to said present position of said movable follower,
said method including the steps of:
1. continuously feeding said liquid to said tank from said source of supply, and concurrently therewith
2. continuously delivering said liquid from said tank to said source of demand, and
3. varying said present position of said movable follower within said tank responsive to changes in the volume of said liquid within said tank consequent upon variations in the respective rates of said feed and said delivery, wherein said volume of said liquid within said tank is always the same as said present volume of said tank.

2. A method according to claim 1 wherein said moveable follower is a piston sealing with said at least one wall of said tank.

3. A method according to claim 2 wherein external pressure is applied to said piston.

4. A method according to claim 3 wherein said external pressure is applied to said piston through a central rod.

5. A method according to claim 1 wherein said port attached to and moveable with said moveable follower is connected to said source of supply or to said source of demand by means of telescopic tubing.

6. A method according to claim 5 wherein said telescopic tubing is immersed in said liquid and passes through said end of said tank.

7. A method according to claim 6 wherein said port attached to and moveable with said moveable follower is pivotally attached to said moveable follower.

8. A method according to claim 1 wherein the volume of said liquid in said tank is controlled by regulation of said rate of supply responsive to movement of said moveable follower.

9. A method according to claim 1 wherein said rate of supply is regulated by a volumetric metering pump.

10. A method according to claim 1 wherein said rate of demand is regulated by a volumetric metering pump.

11. A method according to claim 1 wherein said liquid in said tank is in a substantially laminar flow regime.

12. A method according to claim 11 wherein said liquid is a polymer dope for the manufacture of regenerated cellulose fibre or film.

13. A method according to claim 12 wherein said liquid is a solution of cellulose in a tertiary amine N-oxide.

* * * * *